W. S. Mathews,
Beer Pitcher,
No. 26,115.   Patented Nov. 15, 1859.
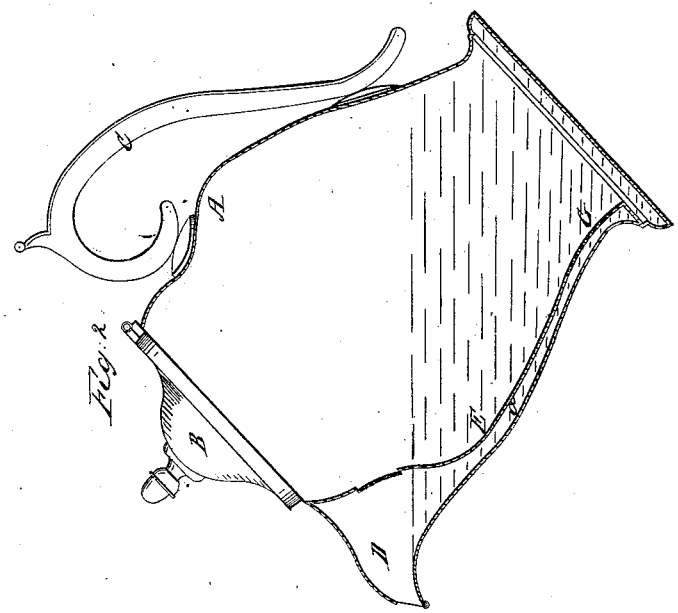
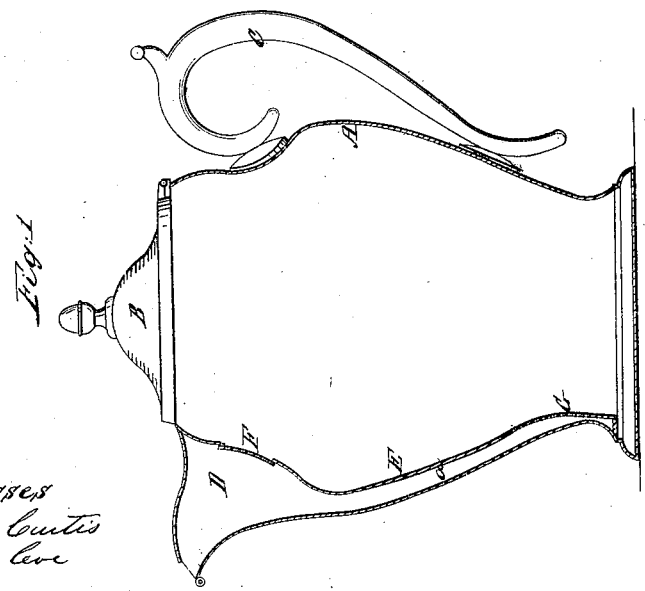
Witnesses
A. H. Curtis
L. E. Cove
Inventor
Wm. S. Mathews

UNITED STATES PATENT OFFICE.

WILLIAM S. MATHEWS, OF MERIDEN, CONNECTICUT.

BEER-PITCHER.

Specification of Letters Patent No. 26,115, dated November 15, 1859.

*To all whom it may concern:*

Be it known that I, W. S. MATHEWS, of Meriden, in the county of New Haven and State of Connecticut, have invented a new and Improved Beer-Pitcher; and I do hereby declare that the following is a full, clear, and exact description of the same, reference being had to the accompanying drawing, making a part of this specification, in which—

Figure 1 represents a vertical central section of my invention in an upright position. Fig. 2 is a similar section of the same in an inclined position.

Similar letters of reference in both views indicate corresponding parts.

When beer or some other foaming liquid is let into a vessel from which it is to be poured out into tumblers, it is desirable to keep the froth, that forms on the top of the liquid, in the vessel, so that the pure liquid only is poured out into the tumblers. It has, therefore, been proposed before to arrange such vessels with the strainer near to the bottom, having a partition extending from said strainer on the inside of the vessel to its top, and forming a channel from the strainer to the spout. This arrangement is found to answer very well as long as the vessel is well supplied with liquid. As soon however as the largest portion of the liquid has been poured out, and when the vessel has to be inclined so as to form a pretty small angle with the horizon, in order to bring the liquid from the bottom strainer to the spout, a portion of said liquid will accumulate between the strainer and the top of the vessel on the inside of the partition, and it will be impossible to get all the liquid out except by opening the lid or cover, and turning the vessel nearly upside down. By so doing the froth will also escape, and it is therefore desirable to arrange the vessel in such a manner that all the liquid can be poured out clear from froth and without opening the lid. This is the object of my invention, and my beer pitcher is arranged with two strainers in a partition behind the spout; one of the strainers being near to the bottom of the pitcher and the other one near to its top, whereby that portion of the liquid which would otherwise accumulate between the bottom strainer and the top of the vessel, is enabled to find its way to the spout without allowing more of the froth to mingle with it than is necessary to give to the beer a lively appearance.

To enable those skilled in the art to make and use my pitcher I will proceed to describe it.

The pitcher, A, with the lid, B, handle, C, and spout, D, is constructed in the usual manner. In the inside of the pitcher, and running from top to bottom or nearly so is the partition, E, forming a channel, $a$, from the bottom part of the vessel to the spout. Two strainers, F and G, are formed in this partition, the strainer, F, near to the bottom, and the strainer, G, near to its top and about opposite to the spout.

If the vessel is now filled with beer, or some other foaming liquid, and if it is brought in an inclined position, as shown in Fig. 2, the liquid will run through the bottom strainer, F, into the channel, $a$, and from thence to the spout. A small portion of the liquid will also find its way through the top strainer, G, to the spout, but the froth will be kept inclosed in the vessel, having no chance to escape through either of the strainers. After nearly all the liquid has been poured out, the vessel has to be inclined so as to bring the partition, E, nearly to a horizontal position, and a small portion of the liquid will accumulate between the bottom strainer and the top, and without the top strainer, G, this portion could not be poured out. With my arrangement all the liquid to the last drop can be poured out clear of froth and without opening the lid.

What I claim as new, and desire to secure by Letters Patent, as a new article of manufacture is:—

A pitcher, A, with two strainers, F and G, one at the bottom and the other at the top of a partition, E, and otherwise constructed as herein specified.

WM. S. MATHEWS.

Witnesses:
A. H. CURTIS,
L. E. COE.